June 25, 1957  M. DROBNEY ET AL  2,797,104
LATERALLY EXTENSIBLE FOOT SUPPORT FOR MOTOR VEHICLES
Filed June 10, 1955
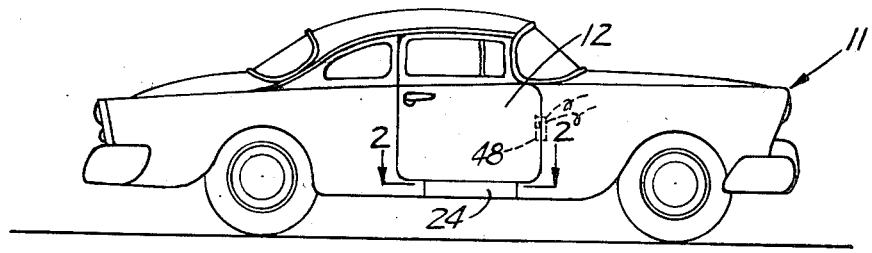
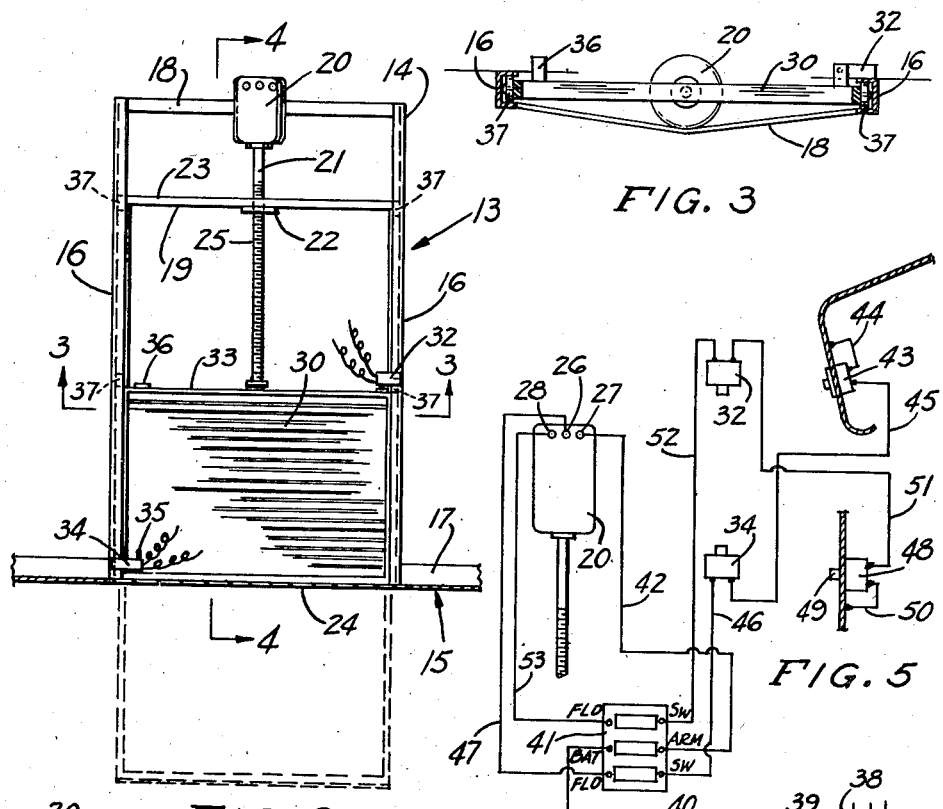
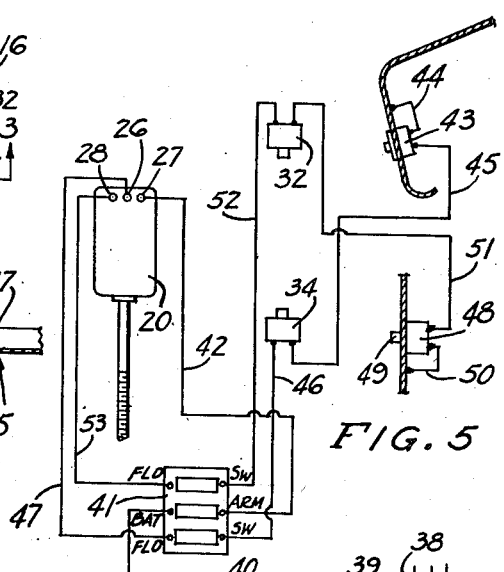
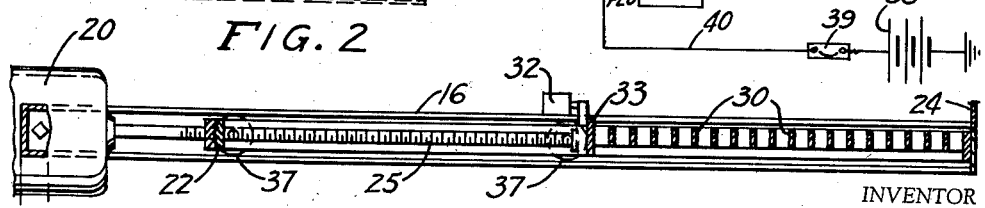
INVENTOR
JOSEPH LUSTIG, Jr.
MARTIN DROBNEY
BY
McMorrow, Berman + Davidson
ATTORNEYS

United States Patent Office 2,797,104
Patented June 25, 1957

2,797,104

LATERALLY EXTENSIBLE FOOT SUPPORT FOR MOTOR VEHICLES

Martin Drobney and Joseph Lustig, Jr., West Willington, Conn.

Application June 10, 1955, Serial No. 514,559

1 Claim. (Cl. 280—166)

This invention relates to motor vehicle body construction, and more particularly to an improved laterally extensible foot support in the nature of a running board which is employed as a step subjacent to a motor vehicle door and which includes scraper means thereon so that the device may be employed as a shoe cleaning or wiping device.

The main object of the invention is to provide a novel and improved laterally extensible step or foot support for a motor vehicle and as a shoe cleaner or scraping device, the improved device being simple in construction, being easy to install, and being simple to operate.

A further object of the invention is to provide an improved laterally extensible foot support device adapted to be mounted subjacent the door of a motor vehicle, said device being electrically operated, involving inexpensive components, being sturdy in construction, and being inconspicuous in appearance.

Further objects and advantages of the invention will become apparent from the following description and claim, and from the accompanying drawings, wherein:

Figure 1 is a side elevational view of a motor vehicle equipped with an improved laterally extensible foot support device according to the present invention;

Figure 2 is an enlarged horizontal cross sectional view taken on line 2—2 of Figure 1;

Figure 3 is a vertical cross sectional view taken on line 3—3 of Figure 2;

Figure 4 is an enlarged vertical cross sectional view taken on line 4—4 of Figure 2; and Figure 5 is a diagram illustrating the electrical circuit employed in the device of Figures 1 to 4.

Referring to the drawings, 11 designates a motor vehicle of generally conventional construction having a body supported on a suitable frame and provided with a door 12 at a side thereof. Designated generally at 13 is a laterally extensible foot support device according to the present invention mounted on the frame subjacent the door 12.

The device 13 comprises a generally rectangular supporting frame 14 which is mounted on the motor vehicle frame in a horizontal position, the vehicle frame being shown at 15 in Figure 2, and the frame 14 being located subjacent the portion of the frame 15 located beneath the door 12. The frame 14 comprises the opposing channel-shaped guide rails 16, 16 connected at their outer ends to the side bar 17 of the motor vehicle frame 15 and connected at their inner ends by a transversely extending cross bar 18. Designated generally at 23 is a rectangular inner frame whose respective side members are slidably received in the guide channels 16, 16, whereby such frame 23 is supported for sliding movement transversely of the vehicle. The frame 23 includes a transversely extending inner end member 19 and a transversely extending outer plate member 24. Designated at 20 is an electric motor which is suitably mounted on the inner transverse bar 18 of the frame 14 and which has a shaft 21 located midway between and parallel with the channel members 16, 16. The shaft 21 has a threaded portion 25 which extends threadedly through a nut member 22 provided on the mid-portion of the end element 19 of the movable frame 23. The motor 20 is of the three-terminal reversible type and when energized by a potential applied at terminals 26 and 27 thereof rotates its shaft 21 in a direction to drive the frame 23 outwardly, whereas when energized by said potential across its terminals 27 and 28, drives the shaft 21 in the opposite direction, to retract the frame 23.

Mounted on the frame 23 is a rectangular foot support 30 which may be of any suitable design, and which is preferably in the form of a grating, as shown in Figure 4, the outer plate 24 projecting upwardly a substantial distance above the top plane of the grating 30, whereby said outer plate 24 serves as a shoe cleaner or scraper when the device is in its outwardly extended position.

Designated at 32 is a first limit switch which is mounted on one of the channel members 16 and which has an actuator element thereof engageable by the rear edge portion 33 of the foot supporting grating 30 when the grating 30 is in its retracted position, shown in full line view in Figure 2, whereby the limit switch 32 is opened. Designated at 34 is a second normally closed limit switch which is mounted on a channel member 16 adjacent the vehicle frame element 17, as shown in Figure 2, and has an actuator element 35 engageable by an upstanding lug 36 on the inner member 33 of grating 30 when the grating 30 is in its extended position, shown in dotted view in Figure 2. When the grating 30 is in its dotted view position of Figure 2, the upstanding lug element 36 engages the actuator 35 and opens limit switch 34, as will be presently described.

As shown in Figure 4, the frame 19 is provided at its side portions with respective pairs of rollers 37, 37, whereby the frame 19 is slidably supported in the channels 16, the rollers 37 engaging inside said channels in the manner shown in Figure 4.

Referring now to Figure 5, it will be seen that the vehicle battery 38 has one terminal thereof grounded and has the other terminal thereof connected through a circuit breaker 39, a wire 40, a conventional relay 41 and a wire 42 to the motor terminal 27. The relay 41 is conventional in construction and is arranged to maintain the wire 40 connected to the terminal 27 of the motor 20 at all times, whereby the ungrounded side of the battery 38 is connected to the motor terminal 27. Designated at 43 is a manually operated switch which is mounted in the door jamb or in any other convenient location adjacent the door 12 so that a person may easily reach the switch 43, one terminal of the switch being connected to the vehicle frame or body by a wire 44, the other terminal of the switch being connected by wire 45 to one terminal of the limit switch 34. The other terminal of the limit switch is connected by a wire 46 through suitable contacts of relay 41 to a wire 47 which is in turn connected to the terminal 26 of motor 20. The limit switch 34 is normally closed, and the switch 43 is normally open, so that when the switch 43 is manually closed, an energizing circuit is provided for causing the motor 20 to drive its shaft 21 in a direction to extend the grating 30 to its dotted view position of Figure 2. The energization of motor 20 will continue until the lug 36 engages the actuator element 35 of switch 34, causing the switch 34 to open and thus terminating energization of the motor 20 with the grating 30 in its extended position.

Designated at 48 is a normally open door switch which is mounted on the vehicle frame and which has an actuator 49 engageable by the door 12 when the door is closed to close the switch 48. One terminal of switch 48 is connected to ground, as by a wire 50, and the other terminal of the switch is connected by a wire 51 to one terminal of the limit switch 32. The other terminal of the limit switch 32 is connected by a wire 52 through suitable contacts of the relay 41 to a wire 53, which is in turn connected to the terminal 28 of the motor 20.

The switch 48 is closed when the vehicle door 12 is closed, being otherwise open. When the grating 30 is in its extended position and the vehicle door 12 is closed, the closure of switch 48 energizes the motor 20 by a circuit including wire 50, switch 48, wire 51, switch 32 (normally closed), wire 52, the contacts of relay 41, wire 53, and terminal 28 of motor 20 connecting terminal 28 to ground, causing the motor to be energized to rotate its shaft 21 in a direction to retract the grating 30. When the end member 33 of grating 30 engages the actuator of the limit switch 32, the limit switch is opened, terminating the energization of motor 20.

In operation, a person desiring to enter the vehicle 11 opens the door 12 and actuates the manual switch 43. This causes the grating 30 to be extended to the dotted view position thereof of Figure 2, whereupon the person may mount on the grating 30 and may clean his shoes by scraping the same on the upstanding blade element 24, with both feet supported on the grating 30, whereby both shoes may be cleaned without the necessity of stepping down from the support device. The person may then enter the vehicle and close the door 12, whereupon the door switch 48 closes and energizes the circuit for motor 20, causing the motor to be energized and drive its shaft to retract the grating 30, said grating 30 being retracted until the actuator of the limit switch 32 is engaged by the inner end element 33 of the grating, opening the motor circuit.

While a specific embodiment of an improved extensible foot support device member of the vehicle has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In a motor vehicle having a body including a frame and a door at the side thereof, a laterally extensible foot support slidably mounted on said frame subjacent said door, a reversible electrical motor mounted on said frame and having a shaft element threadedly engaged with said frame and arranged to move said support laterally responsive to energization of the motor, a first energizing circuit arranged to energize said motor in a direction to extend said support from said frame, means connecting said motor to said first energizing circuit, a first normally closed limit switch mounted on said frame and connected in said first energizing circuit, means on said support arranged to engage and open said limit switch when the support reaches an outward position relative to said door, a second energizing circuit arranged to energize said motor in a direction to retract said support, means connecting said motor to said second energizing circuit, a second normally closed limit switch mounted on said frame and connected in said second energizing circuit, means on said support arranged to engage and open said second switch when the support reaches an inward position relative to said door, a normally open control switch mounted on said body adjacent said door and connected in said second energizing circuit, and means closing said control switch responsive to the closure of said door.

References Cited in the file of this patent

UNITED STATES PATENTS

| 1,616,793 | Goss | Feb. 8, 1927 |
| 1,766,786 | Keenan | June 24, 1930 |
| 2,576,816 | Wahlberg | Nov. 27, 1951 |
| 2,583,894 | Shuck | Jan. 29, 1952 |

FOREIGN PATENTS

| 358,857 | Germany | Sept. 15, 1922 |